United States Patent
Jamison et al.

(10) Patent No.: US 10,572,116 B2
(45) Date of Patent: Feb. 25, 2020

(54) METHODS, APPARATUSES AND COMPUTER PROGRAM PRODUCTS FOR DETECTING ACTIVE USAGE OF A GROUP-BASED COMMUNICATION SYSTEM AND RENDERING A TRIGGER COMPONENT TO AN ASSOCIATED INTERFACE

(71) Applicant: SLACK TECHNOLOGIES, INC., San Francisco, CA (US)

(72) Inventors: Britton Jamison, San Francisco, CA (US); Carly Robinson, San Francisco, CA (US)

(73) Assignee: SLACK TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 15/980,494

(22) Filed: May 15, 2018

(65) Prior Publication Data
US 2019/0354250 A1    Nov. 21, 2019

(51) Int. Cl.
*G06F 3/048*     (2013.01)
*G06F 3/0484*   (2013.01)
*G06Q 30/04*    (2012.01)

(52) U.S. Cl.
CPC .......... *G06F 3/0484* (2013.01); *G06Q 30/04* (2013.01)

(58) Field of Classification Search
CPC .................................................. G06F 3/0484
See application file for complete search history.

(56) References Cited

U.S. PATENT DOCUMENTS

| | | | |
|---|---|---|---|
| 10,021,059 B1* | 7/2018 | Rao | H04L 51/32 |
| 2003/0210265 A1* | 11/2003 | Haimberg | H04L 51/04 |
| | | | 715/758 |
| 2018/0063061 A1* | 3/2018 | Tian | H04L 51/04 |

OTHER PUBLICATIONS

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

(Continued)

*Primary Examiner* — David E Choi
(74) *Attorney, Agent, or Firm* — Alston & Bird LLP

(57) ABSTRACT

An apparatus is provided for detecting active usage of a group-based communication system having a group-based communication interface. The apparatus includes a memory and processor(s) configured to detect group-based activity data stored in the memory of the apparatus. The processor is further configured to determine an active user subset of a group-based communication system user group based on the group-based activity data. The processor is further configured to compare the active user subset to a predetermined user activity threshold. The processor is further configured to, in circumstances where the active user subset satisfies the predetermined user activity threshold, render a trigger component to the group-based communication interface. Corresponding methods and computer program products are also provided.

16 Claims, 14 Drawing Sheets

(56) References Cited

OTHER PUBLICATIONS

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Michael Carney, "Slack is thriving on a cocktail of whimsy and great timing", Pandodaily, Lexisnexis, https://advance.lexis.com/api/permalink/dd2d4ee5-2ddf-4d3a-ald9-3bcee5e38b74/?context=1000516, (dated Feb. 6, 2015, 2:12 AM) 3 pages.

Matthew Ingram, "Flickr co-founder launches Slack, an all-in-one messaging tool designed to kill email forever", GIGAOM, Lexisnexis, https://advance.lexis.com/api/permalink/0b676b7c-aec3-4560-861e-d030d1dd008c/?context=1000516, (dated Feb. 12, 2014, 7:03 PM), 2 pages.

Jonathan Vanian, "Why these startups think chat apps are the next big thing in workplace collaboration", GIGAOM, Lexisnexis, https://advance.lexis.com/api/permalink/e83778c8-09c8-43aa-9ba0-88526283de69/?context=1000516, (dated Aug. 1, 2014, 5:45 PM) 4 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.

Ernie Smith, "Picking Up the Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-buttertield-flickr-and-slack-how-he-snatched-victory-from-the-jaws-of-defeat.html>. (dated May 28, 2014, 2:48 PM) 8 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

Matsumoto, T. et al., "Chocoa Communicator—A New Communication System Based on Awareness and Text Communications—", Fujitsu Sci. Tech. J., 36, 2, (Dec. 2000) 154-161.

\* cited by examiner

400

402

◉ CREDIT CARD    ○ INVOICE

INVOICES WILL BE SENT TO THE PRIMARY OWNER AND ALL ADDITIONAL BILLING CONTACTS AND CAN BE PAID BY BANK TRANSFER OR CHECK WITHIN 30 DAYS.

NUMBER OF USERS

| 14 |

13 OR MORE USERS REQUIRED.

ADDITIONAL BILLING CONTACTS (OPTIONAL)

| @ADMIN ✕ |

ADD CONTACTS BY EMAIL OR SLACK @USERNAME

NEED A PURCHASE ORDER?
◉ NO    ○ YES

| 5 ACTIVE USERS: | $750.00 |
| CREDITS FOR FUTURE USAGE: | $1,350.00 |
| PRORATED REFUND: | ($339.73) |

| SUBTOTAL: | $1,760.27 |
| TAXES: | $156.22 |
| TOTAL: | $1,916.49 |

REVIEW ORDER

FIG. 4

┌─────────────────────────────────────────┐
│ 602
│
INVOICES WILL BE SENT TO THE PRIMARY OWNER AND ALL ADDITIONAL BILLING CONTACTS AND CAN BE PAID BY BANK TRANSFER OR CHECK WITHIN 30 DAYS.

NUMBER OF USERS

| 14 |

13 OR MORE USERS REQUIRED.

ADDITIONAL BILLING CONTACTS (OPTIONAL)

| @ADMIN ✕ |

ADD CONTACTS BY EMAIL OR SLACK @USERNAME

NEED A PURCHASE ORDER?

○ NO   ⦿ YES

PURCHASE ORDER #

| 12345 |

MUST BE NUMERIC AND NO MORE THAN 20 DIGITS LONG

| 5 ACTIVE USERS: | $750.00 |
| CREDITS FOR FUTURE USAGE: | $1,350.00 |
| PRORATED REFUND: | ($339.73) |

| SUBTOTAL: | $1,760.27 |
| TAXES: | $156.22 |
| TOTAL: | $1,916.49 |

604 —

[ REVIEW ORDER ]

FIG. 6

| DELINQUENCY | BILLING CONTACTS | PRIMARY OWNER, ORG OWNER | ACCOUNT EXECUTIVES (AEs) |
|---|---|---|---|
| 1d | ALWAYS | | YES |
| 7d | ALWAYS | | YES |
| 14d | ALWAYS | YES | YES |
| 21d | ALWAYS | YES | YES |

Timing: 1 day delinquent
Recipients: All Billing Contacts & AEs
Template Name: email_dunning_invoice_step_one
Dunning Status: day_1

SUBJECT: <TEAM NAME> Invoice #<INVOICE NUMBER> payment due

*Your payment for Acme is now due.*

*This is just a friendly reminder that Acme Invoice #{XXXXX} is now due. Please see the attached invoice, and reply to let us know when we can expect to receive payment. Or, if you've already sent payment, please provide us with the check/wire details.*

*Thanks,*

*The team at Acme*

Timing: 7 days delinquent
Recipients: All Billing Contacts & AEs
Template Name: email_dunning_invoice_step_two
Dunning Status: day_7

SUBJECT: <TEAM NAME> Invoice #<INVOICE NUMBER> payment past due
___

*Your payment for Acme is past due.*

*Our records indicate that we haven't yet received payment for the past due invoice attached to this email. Could you please let us know the status of this payment, by replying to this email?*

*If you have any questions regarding the details of this invoice, we suggest reaching out to your team's Primary Owner or to receivables@acme.com. We prefer ACH/wire for payment, but a check to our company address will work as well.*

*If you payment isn't received soon, we'll contact other admins on your team, and we may need to downgrade your team to Acme's free plan.*

*Thank you — we appreciate your business!*

*The team at Acme*

Timing: 14 days delinquent
Recipients: Primary Owner, Org Owner(s), Billing Contacts & AEs
Template Name: email_dunning_invoice_step_three
Dunning Status: day_14

SUBJECT: Reminder: <TEAM NAME> Invoice #<INVOICE NUMBER> payment past due

*Your payment for Acme is past due.*

*First off, thank you for being an Acme customer! We really appreciate your business.*

*Our records indicate that we haven't yet received payment for the past due invoice attached to this email. Could you please let us know the status of this payment, by replying to this email?*

*If you have any questions regarding the details of this invoice, we suggest reaching out to receivables@acme.com. We prefer ACH/wire for payment, but a check to our company address will work as well.*

*If payment isn't received soon, we may need to downgrade your team to Acme's free plan.*

*Thanks again,*

*The team at Acme*

Timing: 21 days delinquent
Recipients: Primary Owner, Org Owner(s), Billing Contacts & AEs
Template Name: email_dunning_invoice_step_four
Dunning Status: day_21

SUBJECT: Final notice: <TEAM NAME> Invoice #<INVOICE NUMBER> payment past due

Your payment for Acme is past due.

Hi there — this is just a quick reminder that we haven't yet received payment for the past due invoice attached to this email. Could you please let us know the status of this payment, by replying to this email?

If you have any questions regarding the details of this invoice, we suggest reaching out to receivables@acme.com. We prefer ACH/wire for payment, but a check to our company address will work as well.

If payment isn't received soon, we may need to downgrade your team to Acme's free plan.

Thanks again,

The team at Acme

FIG. 13

METHODS, APPARATUSES AND COMPUTER PROGRAM PRODUCTS FOR DETECTING ACTIVE USAGE OF A GROUP-BASED COMMUNICATION SYSTEM AND RENDERING A TRIGGER COMPONENT TO AN ASSOCIATED INTERFACE

BACKGROUND

Various methods, apparatuses, and systems are configured to determine active usage of a product provided by a group-based communication system and to render a specifically configured interface in response to the same. Applicant has identified many deficiencies and problems associated with existing methods, apparatuses, and systems. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like for determining active usage of a product provided by a group-based communication system. Such embodiments are adapted to render a group-based communication interface having specifically configured user interface components or buttons in response to the same.

In one example embodiment, an apparatus for detecting active usage of a group-based communication system is provided. The apparatus may include a processor and a memory including computer program code. The memory and computer program code are configured to, with the processor, cause the apparatus to at least perform operations including detecting group-based activity data stored in the memory of the apparatus. The at least one memory and the computer program code are further configured to, with the processor, cause the apparatus to determine an active user subset of a group-based communication system user group based on the group-based activity data. The at least one memory and the computer program code are further configured to, with the processor, cause the apparatus to compare the active user subset to a predetermined user activity threshold. The at least one memory and the computer program code are further configured to, with the processor, cause the apparatus to, in circumstances where the active user subset satisfies the predetermined user activity threshold, render a trigger component to a group-based communication interface.

In one example embodiment, a method for detecting active usage of a group-based communication system is provided. The method may include detecting group-based activity data stored in a memory of an apparatus. The method may further include determining an active user subset of a group-based communication system user group based on the group-based activity data. The method may further include comparing the active user subset to a predetermined user activity threshold. The method may further include, in circumstances where the active user subset satisfies the predetermined user activity threshold, rendering a trigger component to a group-based communication interface.

In yet another example embodiment, a computer program product for detecting active usage of a group-based communication system is provided. The computer program product includes at least one computer-readable storage medium having computer-readable program code portions stored therein. The computer-executable program code instructions may include program code instructions configured to detect group-based activity data stored in a memory of an apparatus. The program code instructions may also determine an active user subset of a group-based communication system user group based on the group-based activity data. The program code instructions may also compare the active user subset to a predetermined user activity threshold. The program code instructions may also, in circumstances where the active user subset satisfies the predetermined user activity threshold, render a trigger component to a group-based communication interface.

BRIEF DESCRIPTION OF THE SEVERAL VIEW OF THE DRAWINGS

Having thus described some embodiments in general terms, references will now be made to the accompanying drawings, which are not drawn to scale, and wherein:

FIGS. 4-8 are diagrams of example user interfaces in accordance with some exemplary embodiments of the present invention;

FIG. 9 is a diagram illustrating recipients of electronic invoice dunning communications corresponding to respective delinquency payment periods in accordance with some exemplary embodiments of the present invention;

FIGS. 10-13 are diagrams of example electronic invoice dunning communications in accordance with some exemplary embodiments of the present invention.

DETAILED DESCRIPTION OF VARIOUS EMBODIMENTS

Figure 1:
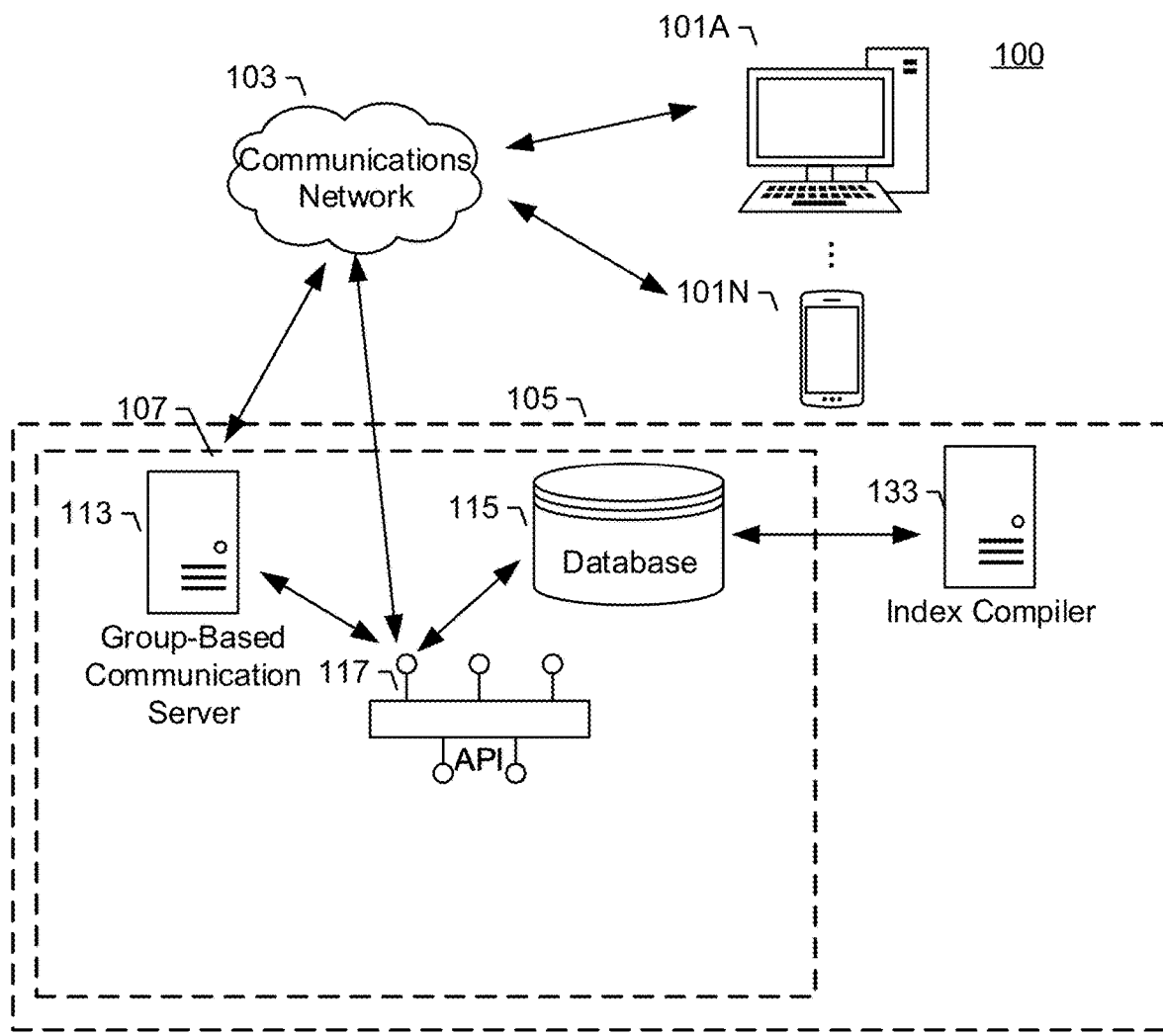
FIG. 1 is an example system infrastructure diagram of a group-based communication platform in accordance with some exemplary embodiments of the present invention.

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention relate generally to determining active usage, by a group of users of an entity, of a product provided by a group-based communication system based in part on detecting a number of interactions with the product and user account status and generates an invoice for the entity to pay for usage of the product with a credit option based in part on determining that a number of users of a group of the entity actively utilizing the product equals or exceeds a predetermined threshold. For example, in an instance in which the number of the users of the group of the entity determined as actively utilizing the product, during an access period (e.g., also referred to herein as a service time period, subscription time period, a service cycle), equals or exceeds a predetermined threshold, the exemplary embodiments may automatically generate an invoice with an option to pay for usage of the product occurring during the access period with funds from a credit account (e.g., a credit card, a line of credit, etc.).

On the other hand, in an instance in which the number of users of the group of the entity determined as actively utilizing the product, during a access period is below a predetermined threshold(s), the exemplary embodiments may automatically generate an invoice without an option (e.g., excluding an option) to pay for usage of the product occurring during the access period with funds from a credit account (e.g., credit card), but may allow other mechanisms of payment (e.g., payment by check, automated clearing house (ACH)/wire transfer, etc.).

Additionally, various embodiments of the present invention relate to generating automated invoice dunning to automatically notify one or more entities that payment for usage of a product provided by a group-based communication system, is due or past due.

Applicant has identified that limiting network latency is important to improving any implementation of a group-based communication system. Solutions that provide manual invoice generation and manual invoice dunning activity at the network constrain network resources and were deemed to create undue network latency.

The exemplary embodiments automate invoice generation and invoice dunning providing improvements in an invoice and dunning management system by freeing up network resources expended on performing several manual tasks to manually generate invoices and for manually reviewing accounts to determine if payment for usage of a product(s) is delinquent and communicating the payment delinquency to corresponding entities (e.g., corporations, organizations, etc.).

By reducing the manual processes and automating invoice generation and invoice dunning, the exemplary embodiments may conserve processing capacity, and memory capacity of network devices and may conserve network bandwidth by minimizing data traffic on the network. Furthermore, since the invoice dunning may be triggered through an application (e.g., a single cron job process), the exemplary embodiments may conserve network resources by reducing simultaneous connections to the network.

By automating invoice generation with options to utilize funds of a credit account for payment of usage of a product based on a number of users of a group of an entity actively utilizing the product equaling or exceeding a predetermined threshold, exemplary embodiments may minimize or eliminate manual steps of deciding whether to extend credit options to entities for usage of products provided by a system (e.g., group-based communication platform). Such elimination of these manual steps associated with several accounts of entities also conserves network resources by minimizing processing capacity and bandwidth at the network.

As such, systems structured in accordance with various embodiments of the invention provide specific, technical solutions to technical problems faced by some systems.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "entity" refers to an organization, institution, association or commercial enterprise, such as for example a corporation or the like that includes individuals in which at least a subset of the individuals may form a defined group of users of the entity associated with corresponding user accounts having attributes authorizing the users to utilize a product provided by the group-based communication system. In some example embodiments, the entity may be a customer of the group-based communication system.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication platform" refers to a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like. The group-based communication platform may also support client retention settings and other compliance aspects. Further, the group-based communication platform may provide comprehensive third party developer support that grants appropriate access to the data and allows third parties to build applications and bots to integrate with customer's workflows.

The term "product" refers to a product or service of the group-based communication system that provides a virtual communications environment to enable a defined group of users (e.g., validated users accessing the environment using client devices) to communicate (e.g., messages, conversations, etc.) with each other and interact with data items (e.g., digital content items (e.g., files), application-related data, etc.) of the group-based communication system. In some example embodiments, the product may be usage of the group-based communication system itself by a group-based communication system user group of an entity.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "group-based communication channel data" refers to data items associated with communications between, and files shared by, channel members of a group-based communication channel.

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The terms "group-based communication channel identifier" or "channel identifier" refer to one or more items of data by which a group-based communication channel may be identified. For example, a group-based communication channel identifier may comprise American Standard Code for Information Interchange (ASCII) text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

As used herein, the terms "messaging communication" and "message" refer to any electronically generated digital content object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

The term "message communication data" refers to messages exchanged (direct messages (DMs) (e.g., messages sent by users directly to each other instead of through channels), reply messages, forwarded messages, etc.) between an apparatus (e.g., a client device) associated with a user account of a user and one or more other users of the group-based communication platform.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "invoice dunning" refers to communications demanding payment of a debt on an entity (e.g., customer) by communicating reminders (e.g., email reminders) regarding payment by the entity when the payment is overdue.

The term "legitimate" refers to a level of trust to offer a credit option to an entity to pay for usage of a product provided by a group-based communication system with funds from a credit account.

The term "illegitimate" refers to a lack of a level of trust of an entity prohibiting the entity from being offered a credit option to pay for usage of a product provided by a group-based communication system with funds from a credit account.

The term "group-based activity data" refers to data items of the group-based communication system including at least one of (i) user identifiers correlated to respective user accounts, corresponding to respective client devices of users of a group-based communication system user group, created within a predefined time period, or (ii) user interaction data representing interactions with communications and data items of the group-based communication system, during time periods, wherein the user interaction data is correlated to user identifiers associated with respective user accounts corresponding to client devices of users of the group-based communication system user group.

Example System Architecture

Methods, apparatuses, and computer program products of the present invention may be embodied by any of a variety of devices. For example, the methods, apparatuses, and computer program products of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example system architecture 100 within which embodiments of the present invention may operate. Users may access a group-based communication system 105 via a communications network 103 using client devices 101A-101N.

The client devices 101A-101N may be any computing device as defined above. Electronic data received by group-based communication system 105 from the client devices 101A-101N may be provided in various forms and via various methods. For example, the client devices 101A-101N may include desktop computers, laptop computers, smartphones, netbooks, tablet computers, wearables, and the like.

In embodiments where a client device of client devices 101A-101N is a mobile device, such as a smart phone or tablet, the client device of client devices 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications.

Additionally or alternatively, the client device of client devices 101A-101N may interact with the group-based communication system 105 via a web browser. As yet another example, the client device of client devices 101A-101N may include various hardware or firmware designed to interface with the group-based communication system 105.

Communications network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 103 may include a cellular telephone, an 802.11, 802.16, 802.20, and/or WiMax network. Further, the communications network 103 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JavaScript Object Notation (JSON) objects sent via a Websocket channel. In some embodiments, the protocol is JSON over RPC, JSON over REST/HTTP, and the like.

In some embodiments, the online data management system 107 comprises a group-based communication server 113, one or more databases 115, and an Application Programming Interface (API) component 117.

The group-based communication server 113 may be embodied as a computer or computers. The group-based communication server 113 may provide for receiving of electronic data from various sources, including but not limited to the client devices 101A-101N. For example, the group-based communication server 113 may be operable to receive and post or transmit group-based messaging communications provided by the client devices 101A-101N via communications network 103.

The API component 117 may be embodied in one or more computers or computing apparatus, such as a server or servers. The API component 117 may be a set of routines, protocols and software system tools that facilitate the data transmission among and between various components of the group-based communication system 105. For example, the API component 117 may receive queries from client devices 101A-101N via the communications network 103. It may also receive data from and transmit data to the group-based communication server 113. The API component 117 may also transmit data to the one or more databases 115.

Further, the API component 117 provides routines that allow a client to search for messages or message metadata. For example, the search.messages API component has a "query" field and performs a search given that query. It also allows for search of message metadata (for example, has: reaction or has:star, from:john).

The one or more databases 115 may be embodied as a data storage device(s) such as a Network Attached Storage (NAS) device or devices, or as a separate database server or servers. In some embodiments, the one or more databases 115 are relational database(s), such as MySQL database(s). The one or more databases 115 include information accessed and stored by the group-based communication server 113 and transmitted from API component 117, and facilitate the operations of the group-based communication server 113. For example, the one or more databases 115 may include, without limitation, a plurality of messaging communications organized among a plurality of group-based communication channels, and/or the like.

In this regard, the one or more databases 115 may serve as the primary data storage of the group-based communication system 105. As described hereinafter, the one or more databases 115 store backups (snapshots) of the data storage, and makes these backups available for index generation processes.

The index compiler 133 may process the metadata and/or contents of the message to index the message (e.g., using the conversation primitive as described below) and facilitate various facets of searching (i.e., search queries that return results from the group-based communication system 105). In one example embodiment, the message may be indexed such that a company's or a group's messages are indexed separately (e.g., in a separate index associated with the group and/or company that is not shared with other groups and/or companies). In another example embodiment, messages may be indexed at a separate distributed repository (e.g., to facilitate data isolation for security purposes).

An example of electronic information exchange among one or more client devices 101A-101N and the group-based communication system 105 is described below.

In some embodiments of an example group-based communication system 105, a message or messaging communication may be sent from a client device of client devices 101A-101N to a group-based communication system 105. In various implementations, the message may be sent to the group-based communication system 105 over communications network 103 directly by a client device of client devices 101A-101N. The message may be sent to the group-based communication system 105 via one or more intermediaries, such as group-based communication server 113, and/or the like. For example, client devices 101A-101N may be a desktop, a laptop, a tablet, a smartphone, and/or the like that is executing a client application (e.g., a group-based communication app).

In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including Extensible Markup Language ("XML") formatted data, as provided below:

```
POST /authrequest.php HTTP/1.1
Host: www.server.com
Content-Type: Application/XML
Content-Length: 667
<?XML version="1.0" encoding="UTF-8"?>
<auth_request>
  <timestamp>2020-12-31 23:59:59</timestamp>
  <user_accounts_details>
    <user_account_credentials>
      <user_name>ID_user_1</user_name>
      <password>abc123</password>
      //OPTIONAL <cookie>cookieID</cookie>
      //OPTIONAL
<digital_cert_link>www.mydigitalcertificate.com/
      JohnDoeDaDoeDoe@gmail.com/mycertifcate.dc</
      digital_cert_link>
      //OPTIONAL
<digital_certificate>_DATA_</digital_certificate>
    </user_account_credentials>
  </user_accounts_details>
  <client_details>//iOS Client with App and Webkit
    //it should be noted that although several client details
    //sections are provided to show example variants of
      client
    //sources, further messages will include only on to save
    //space
    <client_IP>10.0.0.123</client_IP>
    <user_agent_string>Mozilla/5.0 (iPhone; CPU iPhone
      OS 7_1_1 like Mac OS X) AppleWebKit/537.51.2
      (KHTML, like Gecko) Version/7.0 Mobile/11D201
      Safari/9537.53</user_agent_string>
    <client_product_type>iPhone6,1</client_product_
      type>
    <client_serial_number>DNXXX1X1XXXX</client_
      serial_number>
    <client_UDID>3XXXXXXXXXXXXXXXXXXXX
      XXXXD</client_UDID>
    <client_OS>iOS</client_OS>
    <client_OS_version>7.1.1</client_OS_version>
    <client_app_type>app with webkit</client_app_type>
    <app_installed_flag>true</app_installed_flag>
    <app_name>MSM.app</app_name>
    <app_version>1.0</app_version>
    <app_webkit_name>Mobile    Safari</client_webkit_
      name>
    <client_version>537.51.2</client_version>
  </client_details>
  <client_details>//iOS Client with Webbrowser
    <client_IP>10.0.0.123</client_IP>
    <user_agent_string>Mozilla/5.0 (iPhone; CPU iPhone
      OS 7_1_1 like Mac OS X) AppleWebKit/537.51.2
      (KHTML, like Gecko) Version/7.0 Mobile/11D201
      Safari/9537.53</user_agent_string>
    <client_product_type>iPhone6,1</client_product_
      type>
    <client_serial_number>DNXXX1X1XXXX</client_
      serial_number>
    <client_UDID>3XXXXXXXXXXXXXXXXXXXX
      XXXXD</client_UDID>
    <client_OS>iOS</client_OS>
    <client_OS_version>7.1.1</client_OS_version>
```

```
            <client_app_type>web browser</client_app_type>
            <client_name>Mobile Safari</client_name>
            <client_version>9537.53</client_version>
        </client_details>
        <client_details>//Android Client with Webbrowser
            <client_IP>10.0.0.123</client_IP>
            <user_agent_string>Mozilla/5.0 (Linux; U; Android
                4.0.4; en-us; Nexus S Build/IMM76D) AppleWeb-
                Kit/534.30 (KHTML, like Gecko) Version/4.0
                Mobile Safari/534.30</user_agent_string>
            <client_product_type>Nexus S</client_product_type>
            <client_serial_number>YXXXXXXXXZ</client_se-
                rial_number>
            <client_UDID>FXXXXXXXXX-XXXX-XXXX-
                XXXX-XXXXXXXXXXXX</client_UDID>
            <client_OS>Android</client_OS>
            <client_OS_version>4.0.4</client_OS_version>
            <client_app_type>web browser</client_app_type>
            <client_name>Mobile Safari</client_name>
            <client_version>534.30</client_version>
        </client_details>
        <client_details>//Mac Desktop with Webbrowser
            <client_IP>10.0.0.123</client_IP>
            <user_agent_string>Mozilla/5.0 (Macintosh; Intel Mac
                OS X 10_9_3) Apple WebKit/537.75.14 (KHTML,
                like Gecko) Version/7.0.3 Safari/537.75.14</user_
                agent_string>
            <client_product_type>MacPro5,1</client_product_
                type>
            <client_serial_number>YXXXXXXXXZ</client_se-
                rial_number>
            <client_UDID>FXXXXXXXXX-XXXX-XXXX-
                XXXX-XXXXXXXXXXXX</client_UDID>
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
        </client_details>
        <message>
            <message_identifier>ID_message_10</message_iden-
                tifier>
            <team_identifier>ID_team_1</team_identifier>
            <channel_identifier>ID_channel_1</channel_identi-
                fier>
            <contents>That is an interesting invention. I have
                attached a copy our patent policy.</contents>
            <attachments>patent_policy.pdf</attachments>
        </message>
    </auth_request>
```

The group-based communication system 105 comprises at least one group-based communication server 113 that may create a storage message based upon the received message to facilitate message storage in one or more databases 115. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 113 may provide the following example storage message, substantially in the form of a HTTP(S) POST message including) XML-formatted data, as provided below:

```
POST/storage_message.php HTTP/1.1
Host: www.server.com
Content-Type: Application/XML
Content-Length: 667
<?XML version="1.0" encoding="UTF-8"?>
<storage_message>
    <message_identifier>ID_message_10</message_identi-
        fier>
    <team_identifier>ID_team_1</team_identifier>
    <channel_identifier>ID_channel_1</channel_identifier>
    <sending_user_identifier>ID_user_1</sending_user_i-
        dentifier>
    <topics>
        <topic>inventions</topic>
        <topic>patents</topic>
        <topic>policies</topic>
    </topics>
    <responses>
        <response>liked by ID_user_2</response>
        <response>starred by ID_user_3</response>
    </responses>
    <contents>That is an interesting invention. I have
        attached a copy our patent policy.</contents>
    <attachments>patent_policy.pdf</attachments>
    <conversation_primitive>
        conversation includes messages: ID_message_8,
            ID_message_9, ID_message_10,
            ID_message_11, ID_message_12
    </conversation_primitive>
</storage_message>
```

In some embodiments, a group identifier as defined above may be associated with the message. In embodiments, a group-based communication channel identifier as defined above may be associated with the message. In some embodiments, a sending user identifier as defined above may be associated with the message. In one implementation, the message may be parsed (e.g., using Pre Hypertext Processor (PHP) commands) to determine a sending user identifier of the user who sent the message.

In some embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

As described further hereinafter, the above MySQL database command may be modified and used to generate documents for live or computed indexing (via MySQL queries for live indexing in the API component 117.

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In some embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In some embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In some embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitives may be determined based on analysis of topics discussed in the message and other messages (e.g., in the channel) and/or proximity (e.g., message send order proximity, message send time proximity) of these messages. The conversation primitives are also used for shingling and searching over conversations (the messages and their surrounding messages).

In some embodiments, various metadata (determined as described above) and the contents of the message are transmitted from the client devices 101A-101N to the group-based communication system 105 via the communications network 103.

Upon receiving electronic message data from the client devices 101A-101N via communications network 103, the group-based communication server 113 processes and prioritizes electronic message data. The group-based communication server 113 provides persistent broadcast of electronic messages to the client devices 101A-101N connected to the group-based communication system 105 via the communications network 103. For example, when a user John sends an electronic message in a group-based communication channel using a client device, the group-based communication server 113 broadcasts this electronic message to other client devices associated with the same group-based communication channel. In this regard, the group-based communication server 113 serves as a message amplifier.

The group-based communication server 113 also communicates with the API component 117 to initiate the process of writing electronic message data into the one or more databases 115.

Example Apparatuses Utilized with Various Embodiments

Figure 2:
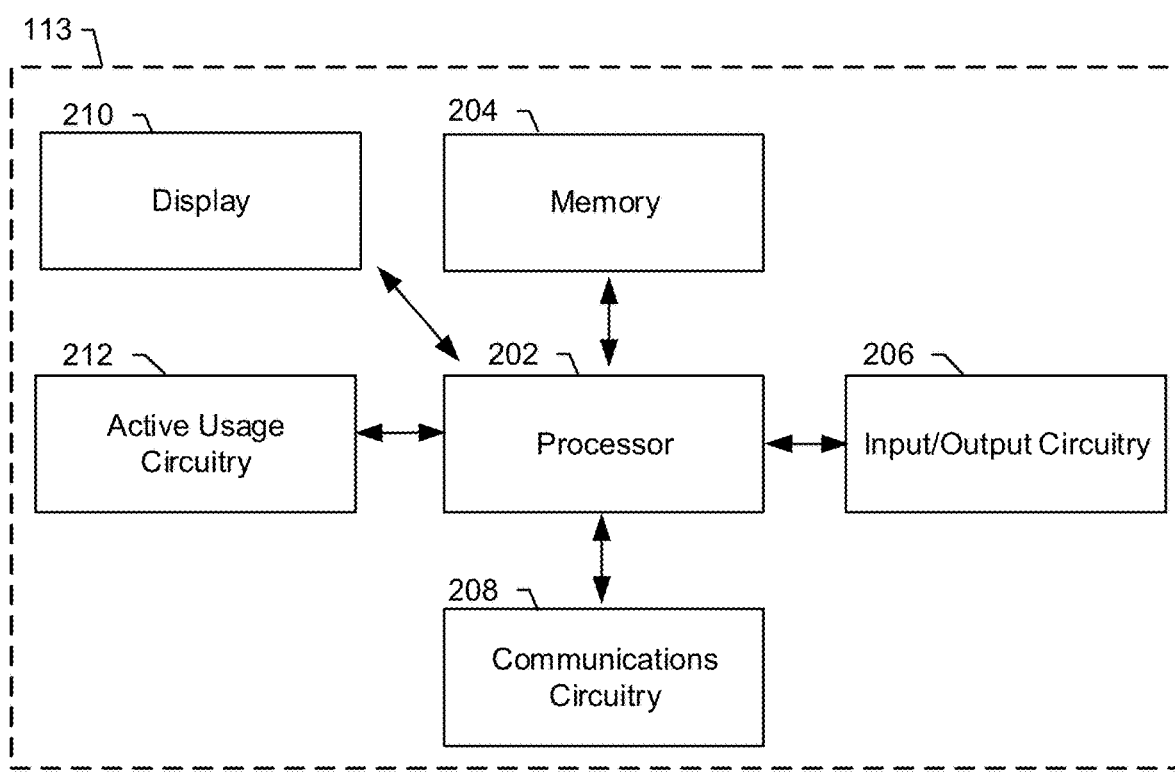
FIG. 2 is a diagram of an apparatus of a group-based communication server in accordance with some exemplary embodiments of the present invention.

The group-based communication server 113 may be embodied by one or more computing systems, such as apparatus 200 shown in FIG. 2. The apparatus 200 may include processor 202, memory 204, input/output circuitry 206, communications circuitry 208, display 210 and active usage circuitry 212. The apparatus 200 may be configured to execute the operations described herein. Although these components 202-212 are described with respect to functional limitations, it should be understood that the particular implementations necessarily include the use of particular hardware. It should also be understood that certain of these components 202-212 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The active usage circuitry 212 includes hardware configured to detect active usage, by one or more users of an entity, of a product provided by a group-based communication system 105 to the entity, as described more fully below. The active usage circuitry 212 may utilize processing circuitry, such as the processor 202, to perform these actions. However, it should also be appreciated that, in some embodiments, the active usage circuitry 212 may include a separate processor, specially configured Field Programmable Gate Array (FPGA), or Application Specific Integrated Circuit (ASIC) for performing the functions described herein. The active usage circuitry 212 may be implemented using hardware components of the apparatus configured by either hardware or software for implementing these planned functions.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Figure 3:
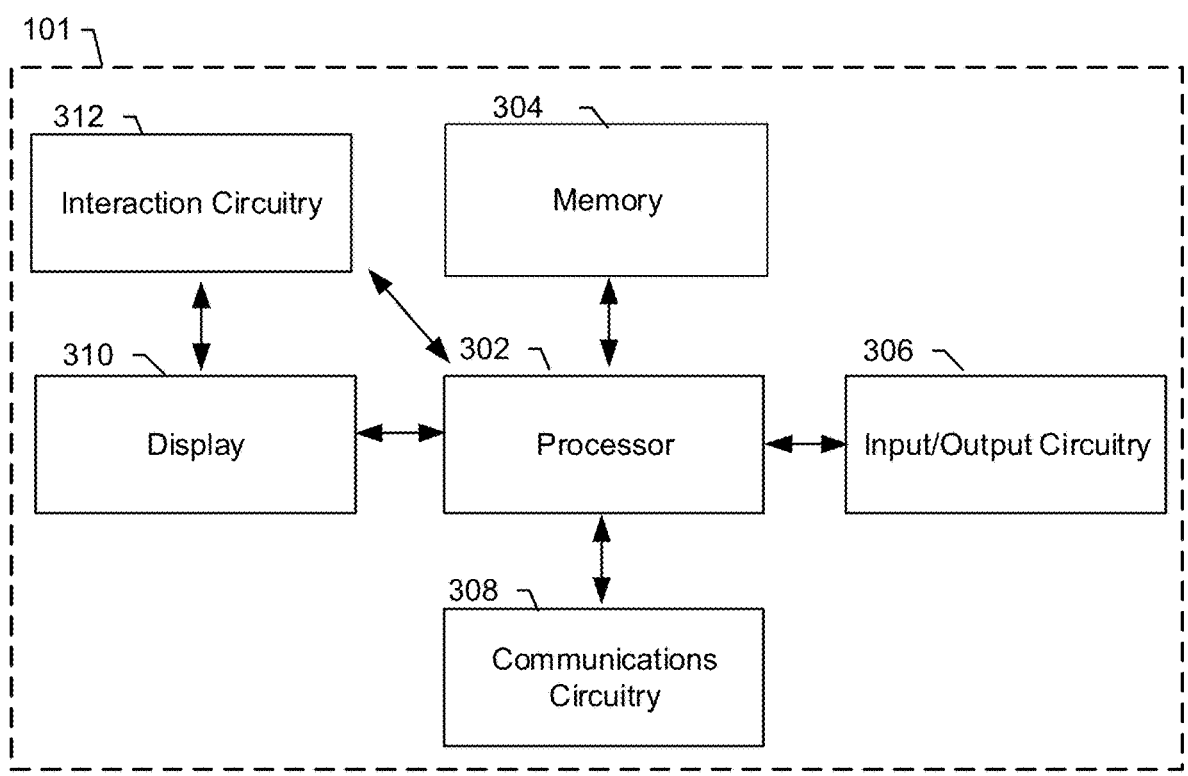
FIG. 3 is a diagram of an apparatus of a client device in accordance with some exemplary embodiments of the present invention.

Referring now to FIG. 3, a client device(s) 101 (e.g., client devices 101A-101N) may be embodied by one or more computing systems, such as apparatus 300 shown in FIG. 3. The apparatus 300 may include processor 302, memory 304, input/output circuitry 306, communications circuitry 308, display 310 and interaction circuitry 312. Although these components 302-312 are described with respect to functional limitations, it should be understood that the particular implementations necessarily include the use of particular hardware. It should also be understood that certain of these components 302-312 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a client device, a kiosk, or the like. In some embodiments, the input/output circuitry 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

The interaction circuitry 312 includes hardware configured to analyze communications and interactions with data items (e.g., messages read, messages written, messages sent/received, etc.) of a group-based communication system and may provide this information, for example in a client log(s) (also referred to herein as clog(s)), to the group-based communication server 113, as described more fully below. The interaction circuitry 312 may utilize processing circuitry, such as the processor 302, to perform these actions. However, it should also be appreciated that, in some embodiments, the interaction circuitry 312 may include a separate processor, specially configured Field Programmable Gate Array (FPGA), or Application Specific Integrated Circuit (ASIC) for performing the functions described herein. The interaction circuitry 312 may be implemented using hardware components of the apparatus configured by either hardware or software for implementing these planned functions.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. Similarly, other elements of the apparatus 300 may provide or supplement the functionality of particular circuitry. For example, the processor 302 may provide processing functionality, the memory 304 may provide storage functionality, the communications circuitry 308 may provide network interface functionality, and the like.

As will be appreciated, any such computer program instructions (e.g., program code instructions) and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flows

As mentioned, various exemplary embodiments determine active usage of a product provided by a group-based communication system and provides automated invoice generation based in part on the detected active usage of the product and automated invoice dunning.

In an example embodiment, an entity (e.g., a corporation, an organization, etc.) may subscribe to the group-based communication system 105 for usage of a product provided by the group-based communication system 105. The subscription of the entity to utilize the product may include a designated number of user accounts correlated to client devices (e.g., client devices 101A-101N) of users of the entity that may exchange communications within the group-based communication system 105 and may interact with data items of the group-based communication system 105. Each of the respective client devices (e.g., client devices 101A-101N) correlated to user accounts of users of the entity may detect, via the interaction circuitry 312, (e.g., in real-time) communications (e.g., messages (e.g., reply messages, direct messages (DMs), messages between users of a channel)) between one or more other client devices correlated to user accounts of other users and interactions with data items (e.g., digital data items (e.g., files), application-related data, etc.) detected by the interaction circuitry 312 of respective client devices of the group-based communication system 105.

In this regard, each of the client devices (e.g., client devices 101A-101N) may generate a message or messaging communication indicating the communications and interactions (e.g., detections of a cursor (e.g., a mouse cursor) interacting with data) with data items to be sent to the group-based communication server 113 of the group-based communication system 105. The message sent from client devices (e.g., client devices 101A-101N) to the group-based communication server 113 may also include data indicating whether a user account(s) of a user(s) correlated to a respective client device(s) is new (e.g., the user(s) newly joined or was newly granted access to the group-based communication system 105 within a time period (e.g., within the past 21 days). In some example embodiments, a user(s) may join the group-based communication system 105 by signing-up to utilize the group-based communication system 105 via a group-based communication app executing on a client device or via a website in response to establishing a user account and validation of login credentials associated with the user account. Furthermore, the message sent from client devices (e.g., client devices 101A-101N) to the group-based communication system 105 may also include data such as message identifiers, sending user identifiers, group identifiers, group-based communication channel identifiers, message contents (e.g., text, emojis, images, links), attachments, message hierarchy data (e.g., relies/forwards to another message), timestamps associated with communications (e.g., generation of messages and/or reading of messages, calls, conversations), third party metadata and any other suitable data. In some example embodiments, the message(s) may be included in a client log(s) by respective client devices and sent to the group-based communication server 113.

For a client device(s) (e.g., client device 101A) correlated to a user account(s) of a user(s) that lacks administrative rights associated with their user profile(s), the client device(s) (e.g., client device 101A) may send the message periodically (e.g., once a day (e.g., nightly)) to the group-based communication server 113. On the other hand, for a client device(s) (e.g., client device 101N) correlated to a user account(s) of a user(s) that is an administrator having administrative rights associated with their user profile(s), the client device(s) (e.g., client device 101N) may send the message in real-time (e.g., upon detecting communications and/or interactions with data items of the group-based communication system 105) to the group-based communication server 113. The term "administrator" refers to a user of an entity who has authority to manage and make decisions on behalf of other users (e.g., users of the entity authorized to utilize the product provided by the group-based communication system 105 under the subscription of the entity with the group-based communication system 105) regarding various tasks within the group-based communication system 105. For example, an administrator may have the authority to set a communication channel as either "public" or "private." As another example, when receiving a request to create a communication channel, an administrator may only have the authority to accept the request on behalf of the users of the group.

Upon receipt of one or more respective messages from one or more of the client devices, the group-based communication server 113 may examine the received messages of the one or more of the client devices (e.g., client devices 101A-101N) to generate group-based activity data that may be stored in a memory (e.g., memory 204) of the group-based communication server 113. For instance, the group-based communication server 113 may analyze the received messages and may detect the message communications (e.g., messages read by client devices of users, messages generated (e.g., also referred to herein as messages written) by client devices of users of the entity) of the client devices correlated to user accounts of users, a time (e.g., 7:00 AM and a date in which respective users joined (e.g., signed up) or were granted access to utilize the group-based communication system 105, user engagement data indicating interactions by client devices (e.g., client devices 101A-101N), correlated to user accounts of users of the entity, with data items (e.g., files, images, etc.) of the group-based communication system 105 for inclusion in the group-based activity data. The group-based communication server 113 may also examine the received messages of one or more of the client devices (101A-101N) and may include data corresponding to the message communications in the group-based activity data including, but not limited to message identifiers, group identifiers, group-based communication channel identifiers, sending user identifiers, timestamps associated with communications (e.g., generation of messages and/or reading of messages, calls, conversations), etc. The timestamps may indicate a time and date associated with the communications.

By examining the group-based activity data, the active usage circuitry 212 of the group-based communication server 113 may determine whether to provide an entity an automated electronic invoice with a credit option allowing the entity to pay for the usage of the product provided by the group-based communication system 105, for product usage that occurred during an access period (e.g., a recurring 30 day cycle), from funds of a credit account (e.g., a credit card account, a line of credit, etc.) associated with the entity, as described more fully below.

In this regard, the active usage circuitry 212 of the group-based communication server 113 may determine whether a number of users of client devices correlated to user accounts of the users of the entity that utilized the product provided by the group-based communication system 105 equals or exceeds a predetermined threshold. For example, in an instance in which a predetermined threshold number (e.g., 3 or more) of users of client devices correlated to user accounts of the users of the entity are detected as actively utilizing the product, an electronic invoice with a credit option(s) may be generated by the group-based communication server 113, as described more fully below.

It should be pointed out that in some example embodiments upon initial install of the product provided by the group-based communication system 105, an entity may start by creating a new free team of users. In this manner, the entity typically has some time between signing up users of the team and when the entity chooses to pay for product usage. After creating the team of users, the quickest way to detect a predetermined threshold number (e.g., 3 or more) of users (e.g., 3 or more active users) may be to invite 3 or more users to the group-based communication system 105 and have the invited users accept the invite (e.g., the invited users may be first marked active upon logging in for the first time). Once the third user has logged in to the group-based communication system 105, the credit option may be generated and accessible.

For instance, to be considered eligible for automated invoicing with a credit option, the entity should have at least a predetermined threshold number (e.g., 3 or more) of users (also referred to herein as active users or active billing users) of client devices (e.g., client devices 101A-101N) correlated to user identifiers of user accounts of the users determined as actively utilizing the product at the time (e.g., upon expiration of an access period) that payment for the usage of the product is due (e.g., initially due, past due or due upon a next access time period). In an example embodiment, users of client devices associated with user accounts of the users of the entity detected as newly signed up users with the group-based communication system 105 may be determined by the group-based communication server 113 as active users (i.e., actively utilizing the product) for a predefined time interval (e.g., the first 21 days after sign up). After expiration of the predefined time period associated with newly signed up users of the entity, other criteria may be utilized by the group-based communication server 113 to determine whether a user(s) of a client device(s) correlated to a user account(s) of the user(s) of the entity actively utilized a product provided by the group-based communication system 105.

For instance, the group-based communication server 113 may determine whether one or more users of client devices correlated to user identifiers of user accounts of the users of the entity utilized the product provided by the group-based communication system 105 within one or more predetermined time periods (e.g., within the prior 14 days). In this regard, the group-based communication server 113 may examine the group-based activity data stored in a memory (e.g., memory 204) and may determine that a user of a client device(s) correlated to a user identifier(s) of a user account(s) of the user(s) of the entity actively utilizes the product in response to detecting that the respective client device(s) interacts (e.g., detecting cursor (e.g., a mouse cursor, a pointer device, etc.) interactions) with data items and/or communications (e.g., a message is read (e.g., a message of a group-based communication channel is read), a message is written (i.e., generated)) within a predefined time interval (e.g., within the prior 14 days). In some example embodiments, the group-based communication server 113 may execute an application (e.g., a cron job) that runs daily (e.g., every morning) that calculates interactions with data items and/or communications for every user and may update each user's active user count accordingly.

In some exemplary embodiments, the group-based communication server 113 may convert or designate an inactive user(s) of a client device(s) correlated to a user account(s) of the user(s) of the entity as an active user (s) in some instances. For example, the group-based communication server 113 may examine the group-based activity data stored in a memory (e.g., memory 204) and may determine that a user(s), previously designated as inactive, of a client device(s) correlated to a user account(s) of the user(s) of the entity is active (i.e., an active user) and actively utilizes the product in response to detecting that a respective client device(s) of the user interacts with a predefined threshold number (e.g., 9) of communications (e.g., a message is read, a message is written (i.e., generated)) within a predetermined time period (e.g., at least 3 different days out of 7 successive days). The group-based communication server 113 may also examine the group-based activity data stored in the memory (e.g., memory 204) and may determine that a user(s), previously designated as inactive, of a client device(s) correlated to a user account(s) of the user(s) of the entity is active and actively utilizes the product in response to detecting that a respective client device(s) of the user sent a predetermined threshold number (e.g., 10) of communications within a predefined time period (e.g., within the prior 7 successive days).

The group-based communication server 113 may also examine the group-based activity data stored in the memory (e.g., memory 204) and may determine that a user, previously designated as active, of a client device(s) correlated to a user account(s) of the user(s) of the entity is inactive (i.e., an inactive user) in response to detecting that the respective client device(s) correlated to a user account of the user has not sent a communication(s) (e.g., a message) within a predefined time interval (e.g., within the prior 7 days). The group-based communication server 113 may also examine the group-based activity data stored in the memory (e.g., memory 204) and may determine that a user, previously designated as active, of a client device(s) correlated to a user account(s) of the user(s) of the entity is inactive in response to detecting that a respective client device(s) correlated to a user account(s) of the user(s) has not interacted with a communication(s) (e.g., a message is read (e.g., a message of a group-based communication channel is read), a message is written (i.e., generated)) within a predefined time interval (e.g., within the prior 14 days).

The group-based communication server 113 may also examine the group-based activity data stored in the memory (e.g., memory 204) and may determine that a user(s), previously designated as active, of a client device(s) correlated to a user account(s) of the user(s) of the entity is inactive in response to detecting that the user account(s) of the user(s) is deactivated by an administrator of the entity.

Consider an example, for purposes of illustration and not of limitation, in which five users of an entity have user accounts, with respective user identifiers, correlated to client devices (e.g., client devices 101A-101N) of the users that are authorized to utilize the group-based communication system 105 per a subscription. In this regard, in an instance in which the group-based communication server 113 determines, in the manner described above, that one of the users (referred to herein as User A) of the entity is detected as a newly signed up user (within a predefined time interval (e.g., within the prior 21 days from sign up)) with the group-based communication system 105, the group-based communication server 113 may determine that User A is an active user.

Additionally, consider, in this example, that the group-based communication server 113 determines that at least two other users (also referred to herein as User B and User C) of client devices (e.g., client devices 101A-101N) correlated to respective user accounts of User B and User C of the entity actively utilizes the group-based communication system 105 in response to detecting that a respective client device(s) of each of User B and User C interacts with a communication(s) (e.g., a message is read, a message is written) within a predefined time interval (e.g., within the prior 14 days). In this example, the group-based communication server 113 may detect that a number (e.g., 3) of users (e.g., Users A, B and C) of the entity are active users equaling a predetermined threshold number (e.g., 3 or more) of active users determined as actively utilizing the group-based communication system 105 in order to provide automated invoicing to the entity, with an option to pay for usage of the group-based communication system 105 at a due date with funds from a credit account.

In response to detecting active usage of the group-based communication system, by an active user subset of a group-based communication system user group (e.g., a number of users (e.g., Users A, B, C) of the entity) satisfying (e.g., equaling/exceeding) a predetermined user activity threshold (e.g., a predetermined threshold number (e.g., 3 or more) of active users), the group-based communication server 113 may also determine that the entity is legitimate signifying a level of trust to offer an option, in an automated electronic invoice, to the entity to pay for usage of the product with funds from a credit account.

In this regard, upon expiration of an initial access period for usage of the group-based communication system 105, payment for usage of the group-based communication system may be initially due and, the group-based communication server 113 may generate a group-based communication interface including a trigger component in response to detecting that the active user subset (e.g., 3 users) satisfies the predetermined user activity threshold (e.g., 3 or more active users). In one example embodiment, the trigger component is a self-service invoice button that is rendered to the group-based communication interface. The trigger component may be configured for engagement by an administrative user of the group-based communication system via a client device (e.g., client device 101). For example, the trigger component may be configured for engagement by an administrative user of the group-based communication system user group associated with at least one administrative identifier of a user profile authorizing the administrative user access to the trigger component.

The group-based communication interface may also include an automated electronic invoice with a plurality of options (e.g., selectable options) to pay for usage of the product that occurred during the access period (e.g., a prior 30 day cycle). In some exemplary embodiments, the trigger component may include a credit option that is selectable to allow the entity to pay for the usage of the group-based communication system 105 with funds from a credit account (e.g., a credit card of the entity, a line of credit given to the entity from a third party, etc.). Some of the other plurality of options to pay for usage of the product may include, but are not limited to, selectable options for the entity to pay with other mechanisms such as ACH electronic wire transfers, a check(s) (e.g., an electronic check, a paper check), etc. The automated electronic invoice generated by the group-based communication server 113 may be provided in an electronic communication/message (e.g., an email message) and sent to one or more recipient electronic message addresses (e.g., email addresses) of recipients designated by the entity and accessible via communication devices (e.g., client devices 101A-101N) when payment for usage of the group-based communication system 105, occurring during a access period, is due. Additionally or alternatively, a group-based communication interface with an automated electronic invoice may be provided by the group-based communication server 113 to a site (e.g., a website) that the entity may access when payment for usage of the product is due.

For example, referring now to FIG. 4, an example embodiment of a group-based communication interface is provided according to an exemplary embodiment. In the example of FIG. 4, the group-based communication server 113 determined that the active user subset (e.g., a number of active users (e.g., Users A, B, C, D, E, e.g., 5 active users)) of group-based communication system user group of an entity exceeds the predetermined user activity threshold (e.g., a predetermined threshold number (e.g., 3 or more) of active users). In response to the group-based communication server 113 determining that the active user subset of group-based communication system user group (e.g., 14 users) of the entity satisfies/exceeds the predetermined user activity threshold, the group-based communication server 113 may cause the trigger component 402 (also referred to herein as credit option 402) to be accessible and rendered in the group-based communication interface 400. In this regard, the entity may pay (e.g., $1916.49) for usage of the group-based communication system 105 with credit (e.g., a credit card) or with other options (e.g., bank transfer, check).

In an example embodiment, the trigger component may only be rendered in the group-based communication interface in response to detecting that an active user subset (e.g., a number of active users (e.g., Users A, B, C)) of the group-based communication system user group of the entity satisfies (e.g., equals or exceeds) a predetermined user activity threshold (e.g., a predetermined threshold number (e.g., 3 or more) of active users). For example, in an instance in which the active user subset (e.g., the number of active users of the group-based communication system user group of the entity) falls below the predetermined user activity threshold (e.g., a predetermined threshold number of active users) before payment is made by the entity, the trigger component may be inaccessible in the group-based communication interface. In some other alternate example embodiments, the group-based communication server 113 may render the group-based communication interface without the trigger component in circumstances where the active user subset fails to satisfy the predetermined user activity threshold. In this regard, the group-based communication server 113 may render the group-based communication interface 400 with the trigger component 402 omitted in circumstances where the active user subset fails to satisfy the predetermined user activity threshold.

Continuing with the example above, consider that User A is no longer a newly signed up user (e.g., upon expiration of a time period (e.g., 22 days) from initial sign up) and the group-based communication server 113 detects that a respective client device(s) (e.g., client device 101) correlated to a user account of User A has not interacted with a communication (e.g., read a message, written a message, etc.) within a predefined time interval (e.g., within the prior 14 days). In this regard, User A may be designated by the group-based communication server 113 as an inactive user such that only User B and User C remain as active users (e.g., two active users) which is below the predetermined user activity threshold (e.g., a predetermined threshold number (e.g., 3 or more) of active users) required for automated invoicing with a credit option.

In this example, in response to detecting that the active user subset (e.g., a number of active users (e.g., User B, User C)) of group-based communication system user group of the entity is below the predetermined user activity threshold (e.g., a predetermined threshold number (e.g., 3 or more) of active users), the group-based communication server 113 may cause the trigger component (which may include a credit option in an automated electronic invoice) to be inaccessible (or not rendered) in a group-based communication interface (e.g., group-based communication interface 400 of FIG. 4). As such, the entity may need to utilize one of the other plurality of options (e.g., an ACH electronic wire transfer, a check, etc.) to pay for usage of the group-based communication system 105.

Figure 5:
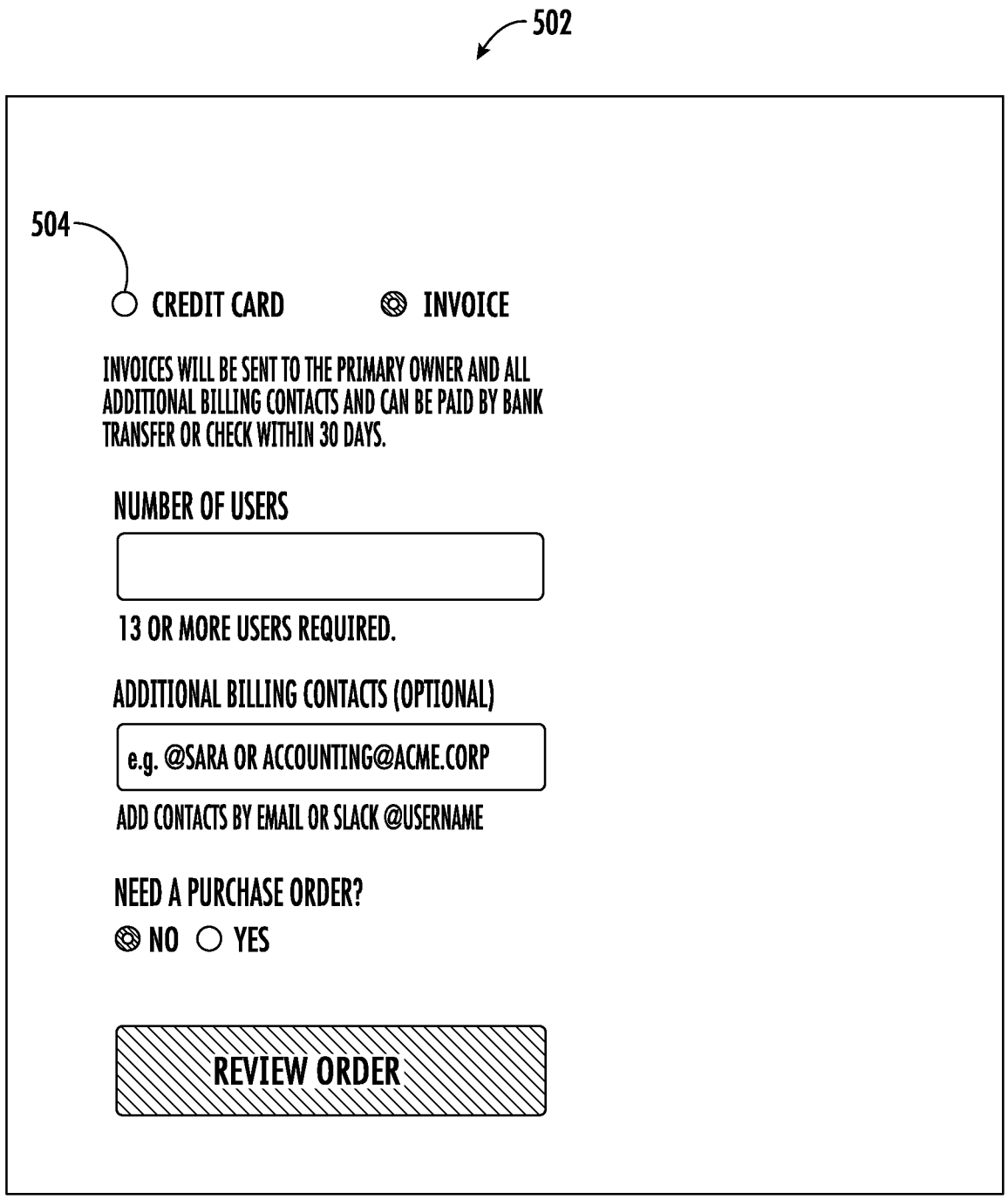

For instance, referring now to FIG. 5, an example embodiment of a group-based communication interface is provided according to an exemplary embodiment. In the example of FIG. 4, the group-based communication server 113 determined that the active user subset (e.g., a number of active users (e.g., User B, User C)) of group-based communication system user group of an entity is below the predetermined user activity threshold (e.g., a predetermined threshold number (e.g., 3 or more) of active users). In response to the group-based communication server 113 determining that the active user subset of group-based communication system user group of the entity is below the predetermined user activity threshold, the group-based communication server 113 may cause the trigger component 504 (also referred to herein as credit option 504) to be inaccessible in the group-based communication interface 502. As such, the entity may need to utilize another option(s) (e.g., bank transfer, a check, etc.) to pay for usage of the group-based communication system 105.

In an instance in which the group-based communication server 113 determines that the active user subset (e.g., the number of active users correlated to client devices and user identifiers of respective user accounts) of the group-based communication system user group of the entity actively utilizing the group-based communication system 105 fails to satisfy (e.g., is below) the predetermined user activity threshold (e.g., a predetermined threshold number (e.g., 3 or more) of active users), the group-based communication server 113 may determine that the entity is illegitimate denoting a lack of a level of trust prohibiting the entity from being offered a credit option (e.g., in the invoice) to pay for usage of the group-based communication system 105 with funds from a credit account.

In some example embodiments, the group-based communication server 113 may detect user engagement of the trigger component within the group-based communication interface and may update an authorization status associated with the group-based communication system user group, with an authorized indicator for accessing and utilizing the group-based communication system for an access period. The authorized indicator may denote that at the time payment is due, the active user subset of the group-based communication system user group satisfies the predetermined user activity threshold. In instances in which the entity pays for usage of the group-based communication system 105 for the access period, the group-based communication server 113 may store a payment indicator in a memory (e.g., memory 204) indicating the payment of the entity.

In some example embodiments, the group-based communication server 113 may automatically generate one or more dunning interface components upon expiration of an access period (e.g., expiration of a 30 day cycle) in response to detecting an indicator (e.g., a non-payment indicator also referred to herein as a delinquent payment indicator) stored in a memory (e.g., memory 204) of the group-based communication server 113. In this regard, the indicator may denote that payment for usage of group-based communication system 105 upon expiration of the access period was not received from the entity.

Referring now to FIG. 6, an example user interface according to an exemplary embodiment is provided. In the example of FIG. 6, the group-based communication server 113 renders the interface 602 in which a user (e.g., an administrator) of an entity sets up a team of users (e.g., 14 users) in the process of purchasing a plan (e.g., a Plus plan) to utilize the group-based communication system 105. In the example of FIG. 6, the user interface 602 receives input of a designation (e.g., from the administrator interacting with the user interface 602) that the plan should include authorization for a team of 14 users to utilize the group-based communication system 105 and designates a number of active users (e.g., 5 active users in the example of FIG. 6) for using the group-based communication system 105 in order to render a trigger component (e.g., trigger component 402) in a group-based communication interface (e.g., group-based communication interface 400). In response to receiving an indication of a selection for a purchase order, the group-based communication server 113 rendered the user interface 602 with a purchase order number (e.g., purchase order number 12345).

Figure 7:
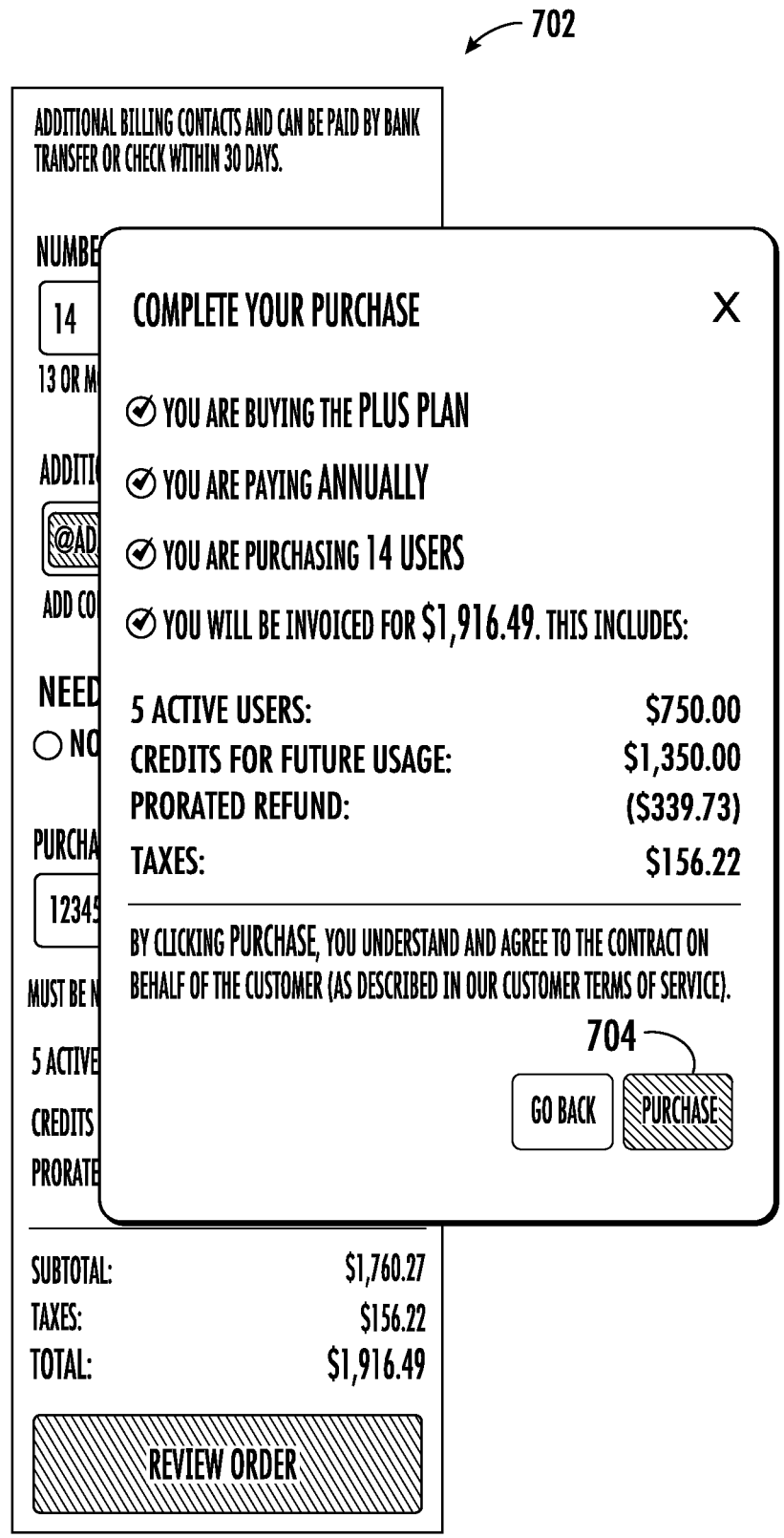

In response to detecting an indication of a selection of the review order tab 604, the group-based communication server 113 may render the user interface 702 as shown in FIG. 7. In the example of FIG. 7, the user interface 702 indicates the plan (e.g., the Plus plan) details for completion in response to indication of a selection the tab 704.

Figure 8:
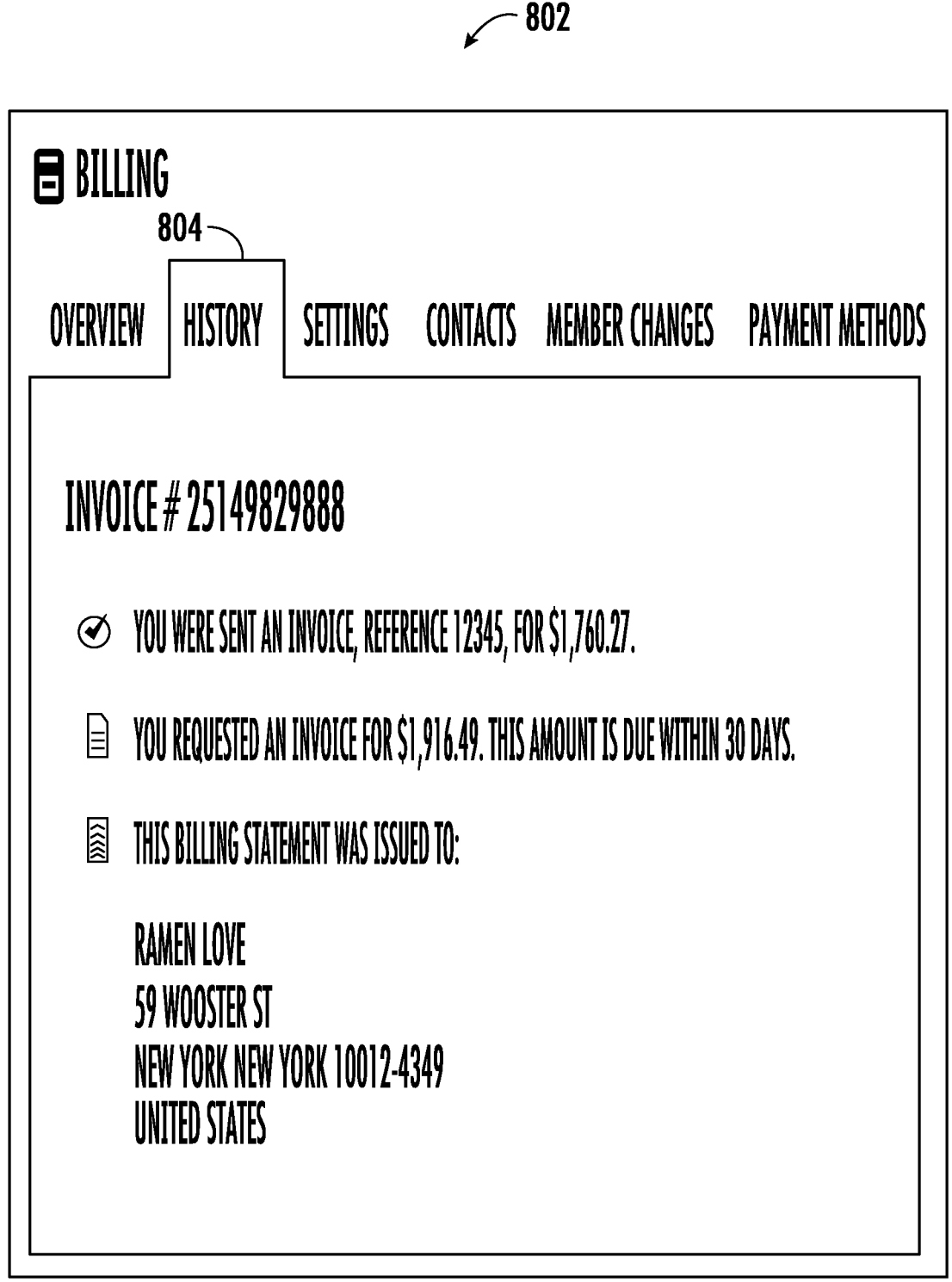

Referring now to FIG. 8, an example user interface according to an exemplary embodiment is provided. In the example of FIG. 8, the group-based communication server 113 rendered the user interface 802 in response to detection on an indication of a selection of tab 804. In this regard, the user interface 802 denotes that an invoice with invoice (e.g., reference) number 12345 for $1,760.27 was sent to a user (e.g., an administrator (e.g., Ramen Love)) and also denotes an amount (e.g., $1,916.49) due within 30 days.

In some example embodiments, in an instance in which an invoice is not initially paid by an entity for usage of a product provided by the group-based communication system 105 on a payment due date, the group-based communication server 113 may generate and provide automated invoice dunning communications to remind the entity that payment is delinquent and past due. The automated invoice dunning communications may be reminders emailed by the group-based communication server 113 to one or more communication devices (e.g., client devices 101A-101N) of recipients of a team/group of the entity, as described more fully below.

The group-based communication server 113 may determine that an entity is delinquent regarding payment in an instance in which payment has not been received by the group-based communication system 105 within 30 days (e.g., per payment terms (e.g., net 30 payment terms) of a subscription) from the date in which the original electronic invoice was initially sent (e.g., via email) to a team of recipients of the entity. The group-based communication server 113 may generate and send an email reminder regarding the payment being overdue on the first day after the 30 day payment due date, a second email reminder may be sent on the seventh day after the first email reminder, a third email reminder may be sent on the fourteenth day after the first email reminder and a fourth email reminder may be sent on the twenty first day after the first email reminder.

For example, suppose an original electronic invoice was initially generated and sent (e.g., via email) by the group-based communication server 113 to a team of recipients of the entity on January 1 indicating that payment is due in 30 days. The group-based communication server 113 may then send an email to a team of recipients of the entity that the payment is due on January 31. If payment is not received by the group-based communication system 105 on January 31, the group-based communication server 113 may automatically generate a first email reminder sent to a team of recipients of the entity on February 1. The email reminder(s) described herein may include the original electronic invoice and may also indicate any applicable late fees. If payment is not received by the group-based communication system 105 within 7 days of the first email reminder of February 1, the group-based communication server 113 may automatically generate a second email reminder sent to a team of recipients of the entity on February 8. Further, if payment is not received by the group-based communication system 105 within 14 days of the first email reminder of February 1, the group-based communication server 113 may automatically generate a third email reminder sent to a team of recipients of the entity on February 15. If payment is not received by the group-based communication system 105 within 21 days of the first email reminder of February 1, the group-based communication server 113 may automatically generate a fourth email reminder sent to a team of recipients of the entity on February 22.

Referring to FIG. 9, a diagram illustrating recipients of a team of an entity that receives reminders associated with various payment delinquency time periods is provided according to an exemplary embodiment. As shown in FIG. 9, on a first day (referred to in FIG. 9 as "1d", e.g., February 1 in the example above) of delinquency, the group-based communication server 113 may automatically generate and send an email reminder that a payment is past due to recipient email addresses of billing contacts and account executives (AEs) of the entity. Likewise, on a seventh day (referred to in FIG. 9 as "7d", e.g., February 8 in the example above) of delinquency, the group-based communication server 113 may automatically generate and send an email reminder that a payment is past due to recipient email addresses of the billing contacts and the account executives of the entity.

On the fourteenth day (referred to in FIG. 9 as "14d", e.g., February 15 in the example above) of delinquency, the group-based communication server 113 may automatically generate and send an email reminder that a payment is past due to recipient email addresses of billing contacts, a primary owner, an organization (org) owner and account executives of the entity. Similarly, on the twenty first day (referred to in FIG. 9 as "21d", e.g., February 22 in the example above) of delinquency, the group-based communication server 113 may automatically generate and send an email reminder that a payment is past due to email addresses of billing contacts, the primary owner, the organization owner and the account executives of the entity.

Referring now to FIGS. 10-13, diagrams of example automated electronic invoice dunning communications are provided according to an example embodiment. As shown in the example of FIG. 10, the group-based communication server 113 automatically generated an electronic dunning interface component(s) 500 (email) on a first day (referred to as day_1 in FIG. 10) of delinquency of a payment for usage of a product provided by a group-based communication system (e.g., group-based communication system 105) of a company such as, for example, the fictional company Acme, in FIG. 10, to a team of recipients (e.g., all billing contacts and account executes) of an entity. The example electronic dunning interface component(s) 500 (e.g., dunning interface components of an email interface) of FIG. 10, automatically generated by group-based communication server 113 may indicate that payment is now due and may include the electronic invoice indicating the outstanding payment amount due, and any late fees if applicable.

In some example embodiments, the electronic invoice sent (e.g., emailed) in the electronic dunning interface component(s) may include a credit option allowing the entity to make payment with funds of a credit account in an instance in which the number of users of the entity associated with user accounts correlated to client devices actively utilizing a product provided by the group-based communication system 105, as determined at the time a dunning communication(s) (e.g., email(s)) is sent, equals or exceeds a predetermined threshold number (e.g., 3 or more) of active users, in the manner described above. In an instance in which the number of users associated with user accounts correlated to client devices actively utilizing the product is below the predetermined threshold number of active users, the credit option may not be accessible/available, in the manner described above. Further, in some example embodiments the invoice dunning communications may be triggered/generated in response to the group-based communication server 113 executing an application (e.g., a single cron job process/application).

Referring now to FIG. 11, the group-based communication server 113 automatically generated an electronic dunning interface component(s) 600 on a seventh day (referred to as day_7 in FIG. 11) of delinquency of a payment for usage of a product provided by a group-based communication system (e.g., group-based communication system 105) of a company such as, for example, the fictional company Acme, in FIG. 11, to a team of recipients (e.g., all billing contacts and account executes) of the entity. The example dunning interface component(s) 600 (e.g., dunning interface components of an email interface) of FIG. 11, automatically generated by group-based communication server 113 may indicate that payment is past due and may include the electronic invoice indicating the outstanding payment amount due and may request a status update from recipients of the team by replying to an email of the automated electronic dunning interface component(s) 600. The automated electronic dunning interface component(s) 600 may also suggest reaching out to the team's primary owner or to a reply-to address of Acme such as receivables@acme.com for questions and a preference for ACH/wire transfer for payment but that a check to the company address of Acme is acceptable. Additionally, the automated electronic dunning interface component(s) 600 may indicate that if payment is not received soon, other administrators on the team of the entity may be contacted and that the team of the entity may be downgraded to Acme's free plan. In this regard, the group-based communication server 113 may downgrade a level of a product for usage by the entity in response to detecting that payment was not received during a subsequent time period.

Referring now to FIG. 12, the group-based communication server 113 automatically generated an electronic dunning interface component(s) 700 (e.g., dunning interface components of an email interface) on a fourteenth day (referred to as day 14 in FIG. 12) of delinquency of a payment for usage of a product provided by a group-based communication system (e.g., group-based communication system 105) of a company such as, for example, the fictional company Acme, in FIG. 12, to a team of recipients (e.g., a primary owner, an org owner(s), billing contacts and account executes) of the entity. The example electronic dunning interface component(s) 700 of FIG. 12, automatically generated by group-based communication server 113 may indicate that payment is past due and may include the electronic invoice indicating the outstanding payment amount due, and any late fees if applicable and may request a status update from recipients of the team by replying to an email of the automated electronic dunning interface component(s) 700. The automated electronic dunning interface component(s) 700 may also suggest reaching out to a reply-to address of Acme such as receivables@acme.com for questions and indicates a preference for ACH/wire transfer for payment but that a check to the company address of Acme is acceptable. Additionally, the automated electronic dunning interface component(s) 700 may indicate that if payment is not received soon the team of the entity may be downgraded to Acme's free plan.

Referring now to FIG. 13, the group-based communication server 113 automatically generated an electronic dunning interface component(s) 800 (e.g., dunning interface components of an email interface) on a twenty first day (referred to as day_21 in FIG. 13) of delinquency of a payment for usage of a product provided by a group-based communication system (e.g., group-based communication system 105) of a company such as, for example, the fictional company Acme, in FIG. 13, to a team of recipients (e.g., a primary owner, an org owner(s), billing contacts and account executes) of the entity. The example dunning interface component(s) 800 of FIG. 13, automatically generated by group-based communication server 113 may indicate that the dunning email is a final notice that payment is past due and may include the electronic invoice indicating the outstanding payment amount due, and any late fees if applicable and may request a status update from recipients of the team by replying to an email of the automated electronic dunning interface component(s) 800. The automated electronic dunning interface component(s) 800 may also suggest reaching out to a reply-to address of Acme such as receivables@acme.com for questions and indicates a preference for ACH/wire transfer for payment but that a check to the company address of Acme is acceptable. The automated electronic dunning interface component(s) 800 may also indicate that if payment is not received soon, the team of the entity may be downgraded to a free plan by Acme.

Figure 14:
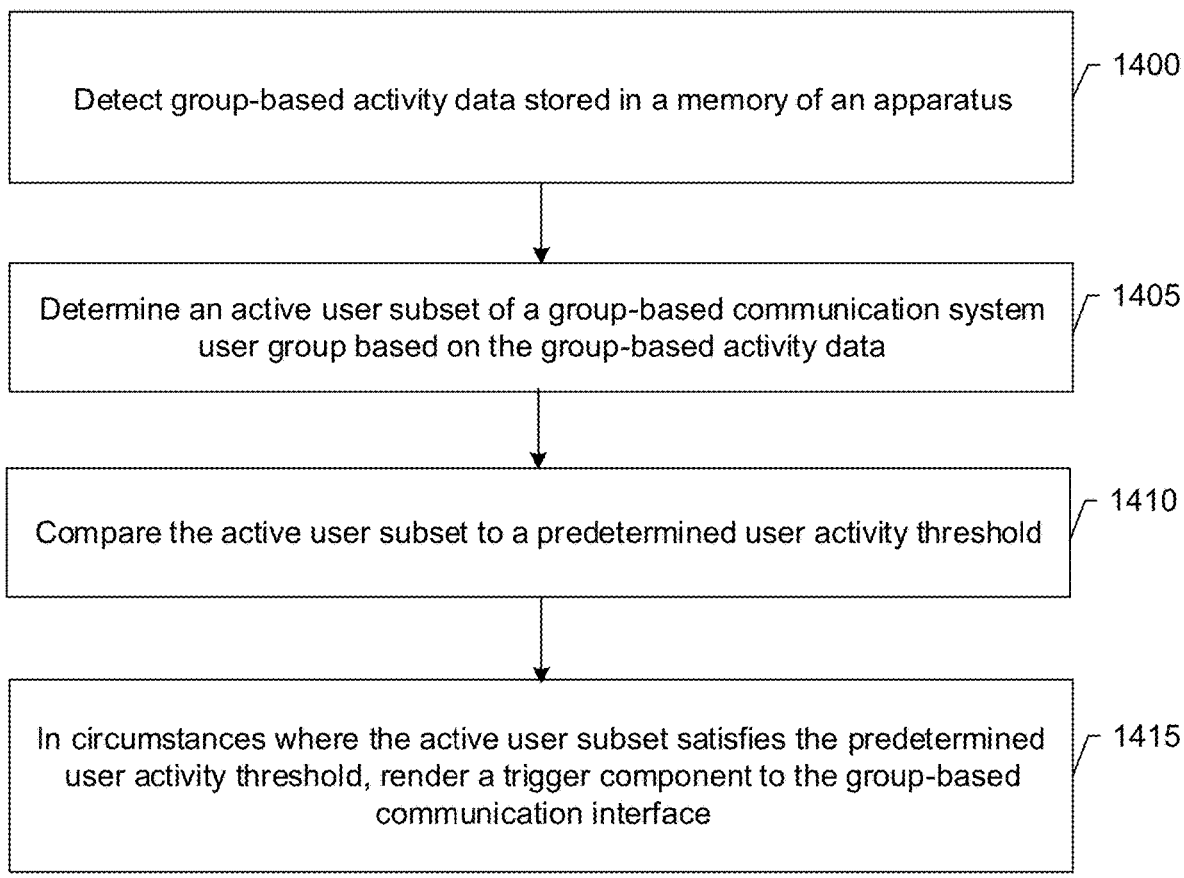
FIG. 14 is an example flowchart illustrating example methods in accordance with some exemplary embodiments of the present invention.

Referring now to FIG. 14, an example embodiment of a flowchart for detecting active usage of a group-based communication system having a group-based communication interface according to an example embodiment is provided. At operation 1400, an apparatus (e.g., group-based communication server 113) may detect group-based activity data stored in a memory (e.g., memory 204) of the apparatus. At operation 1405, the apparatus (e.g., group-based communication server 113) may determine an active user subset of a group-based communication system user group based on the group-based activity data. At operation 1410, the apparatus (e.g., group-based communication server 113) may compare the active user subset (e.g., at least 3 active users of the group-based communication system user group) to a predetermined user activity threshold (e.g., 3 or more users). At operation 1415, the apparatus (e.g., group-based communication server 113) may, in circumstances where the active user subset satisfies the predetermined user activity threshold, render a trigger component to the group-based communication interface.

Additional Implementation Details

Although example processing systems have been described in FIGS. 1-3, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed:

1. An apparatus for detecting active usage of a group-based communication system having a group-based communication interface, the apparatus comprising at least one processor and at least one non-transitory memory including program code, the at least one non-transitory memory and the program code configured to, with the processor, cause the apparatus to at least:
    detect group-based activity data stored in the memory of the apparatus;
    determine an active user subset of a group-based communication system user group based on the group-based activity data;
    compare the active user subset to a predetermined user activity threshold;
    in circumstances where the active user subset satisfies the predetermined user activity threshold, render a trigger component to the group-based communication interface;
    detect user engagement of the trigger component within the group-based communication interface;
    update an authorization status associated with the group-based communication system user group with an authorized indicator for an access period; and
    automatically generate dunning interface components upon expiration of the access period in response to detecting an indicator stored in the memory of the apparatus.

2. The apparatus of claim 1, wherein the trigger component is configured for engagement by an administrative user of the group-based communication system.

3. The apparatus of claim 1, wherein the memory including the program code is further configured to, with the processor, cause the apparatus to:
    render the group-based communication interface without the trigger component in circumstances where the active user subset fails to satisfy the predetermined user activity threshold.

4. The apparatus of claim 1, wherein the memory including the program code is further configured to, with the processor, cause the apparatus to:
    determine the active user subset by (i) detecting interactions and communications, via respective client devices correlated to user identifiers of respective user accounts of the group-based communication system user group, with the group-based communication system, wherein the interactions and communications satisfy respective predefined thresholds during predetermined time periods and (ii) detecting user identifiers of respective user accounts, correlated to respective client devices, of the group-based communication system user group created within a predefined time period.

5. The apparatus of claim 1, wherein the memory including the program code is further configured to, with the processor, cause the apparatus to:
automatically send the dunning interface components to a communication device of at least one user of the group-based communication system user group.

6. The apparatus of claim 1, wherein the group-based activity data comprises at least one of (i) user identifiers correlated to respective user accounts, corresponding to respective client devices of users of the group-based communication system user group, created within a predefined time period, or (ii) user interaction data representing interactions with communications and data items of the group-based communication system, during time periods, wherein the user interaction data is correlated to user identifiers associated with respective user accounts corresponding to client devices of users of the group-based communication system user group.

7. A method for detecting active usage of a group-based communication system having a group-based communication interface, the method comprising:
detecting group-based activity data stored in a memory of an apparatus;
determining an active user subset of a group-based communication system user group based on the group-based activity data;
comparing the active user subset to a predetermined user activity threshold;
in circumstances where the active user subset satisfies the predetermined user activity threshold, rendering a trigger component to the group-based communication interface;
detecting user engagement of the trigger component within the group-based communication interface;
updating an authorization status associated with the group-based communication system user group with an authorized indicator for an access period; and
automatically generating dunning interface components upon expiration of the access period in response to detecting an indicator stored in the memory of the apparatus.

8. The method of claim 7, wherein the trigger component is configured for engagement by an administrative user of the group-based communication system.

9. The method of claim 7, further comprising:
rendering the group-based communication interface without the trigger component in circumstances where the active user subset fails to satisfy the predetermined user activity threshold.

10. The method of claim 7, further comprising:
determining the active user subset by (i) detecting interactions and communications, via respective client devices correlated to user identifiers of respective user accounts of the group-based communication system user group, with the group-based communication system, wherein the interactions and communications satisfy respective predefined thresholds during predetermined time periods and (ii) detecting user identifiers of respective user accounts, correlated to respective client devices, of the group-based communication system user group created within a predefined time period.

11. The method of claim 7, further comprising:
automatically sending the dunning interface components to a communication device of at least one user of the group-based communication system user group.

12. The method of claim 7, wherein the group-based activity data comprises at least one of (i) user identifiers correlated to respective user accounts, corresponding to respective client devices of users of the group-based communication system user group, created within a predefined time period, or (ii) user interaction data representing interactions with communications and data items of the group-based communication system, during time periods, wherein the user interaction data is correlated to user identifiers associated with respective user accounts corresponding to client devices of users of the group-based communication system user group.

13. A computer program product for detecting active usage of a group-based communication system having a group-based communication interface, the computer program product comprising at least one non-transitory computer-readable storage medium having computer-executable program code instructions stored therein, the computer-executable program code instructions comprising:
program code instructions configured to detect group-based activity data stored in a memory of an apparatus;
program code instructions configured to determine an active user subset of a group-based communication system user group based on the group-based activity data;
program code instructions configured to compare the active user subset to a predetermined user activity threshold;
program code instructions configured to, in circumstances where the active user subset satisfies the predetermined user activity threshold, render a trigger component to the group-based communication interface;
program code instructions configured to detect user engagement of the trigger component within the group-based communication interface;
program code instructions configured to update an authorization status associated with the group-based communication system user group, with an authorized indicator for an access period; and
program code instructions configured to automatically generate dunning interface components upon expiration of the access period in response to detecting an indicator stored in the memory of the apparatus.

14. The computer program product of claim 13, wherein the trigger component is configured for engagement by an administrative user of the group-based communication system.

15. The computer program product of claim 13, further comprising:
program code instructions configured to render the group-based communication interface without the trigger component in circumstances where the active user subset fails to satisfy the predetermined user activity threshold.

16. The computer program product of claim 13, further comprising:
program code instructions configured to determine the active user subset by (i) detecting interactions and communications, via respective client devices correlated to user identifiers of respective user accounts of the group-based communication system user group, with the group-based communication system, wherein the interactions and communications satisfy respective predefined thresholds during predetermined time periods and (ii) detecting user identifiers of respective user accounts, correlated to respective client devices, of the group-based communication system user group created within a predefined time period.

* * * * *